Figure 1:
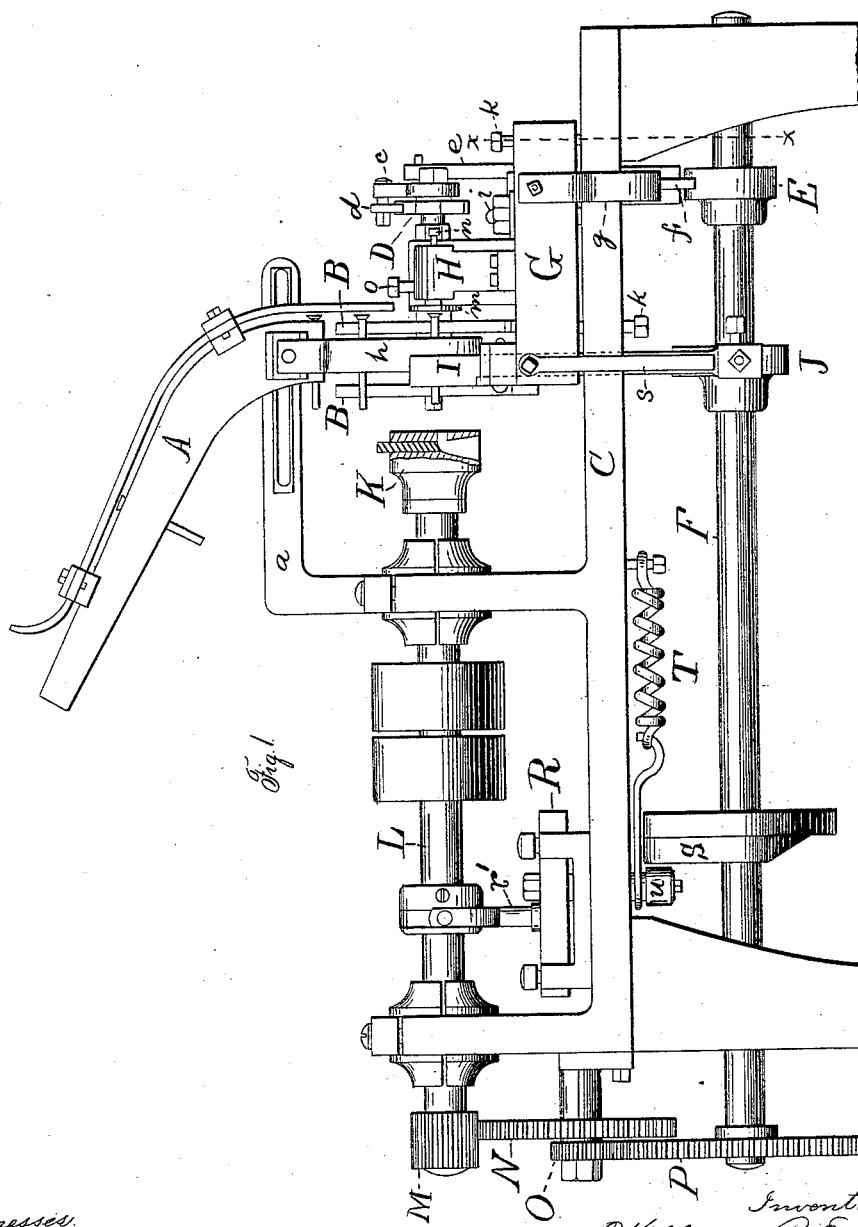

(No Model.)   3 Sheets—Sheet 1.

W. B. EDWARDS.
MACHINE FOR POINTING BOLTS.

No. 285,738.   Patented Sept. 25, 1883.

Witnesses.
John Edwards Jr
E. B. Olaershaw

Inventor.
William B. Edwards
By James Shepard
atty (No Model.)　　　　　　　　　　　　　　　　　3 Sheets—Sheet 2.
W. B. EDWARDS.
MACHINE FOR POINTING BOLTS.
No. 285,738.　　　　　　　　Patented Sept. 25, 1883.
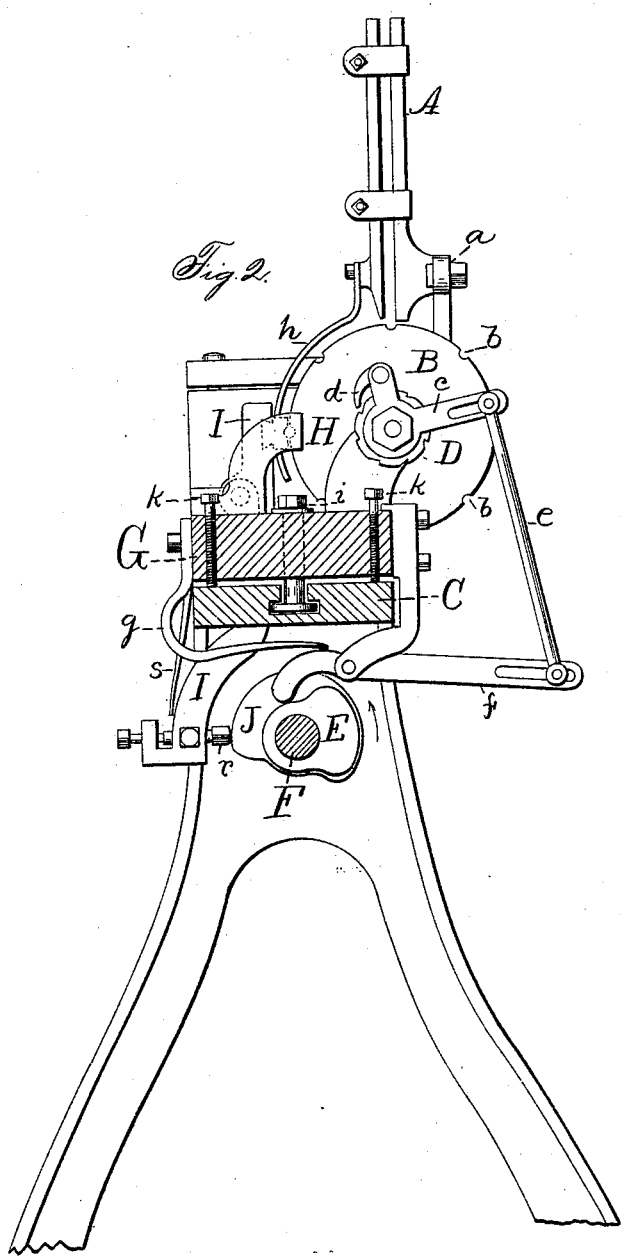
Witnesses:
John Edwards Jr.
E. B. Oldershaw
Inventor.
William B. Edwards.
By James Shepard
atty (No Model.) 3 Sheets—Sheet 3.
W. B. EDWARDS.
MACHINE FOR POINTING BOLTS.
No. 285,738. Patented Sept. 25, 1883.
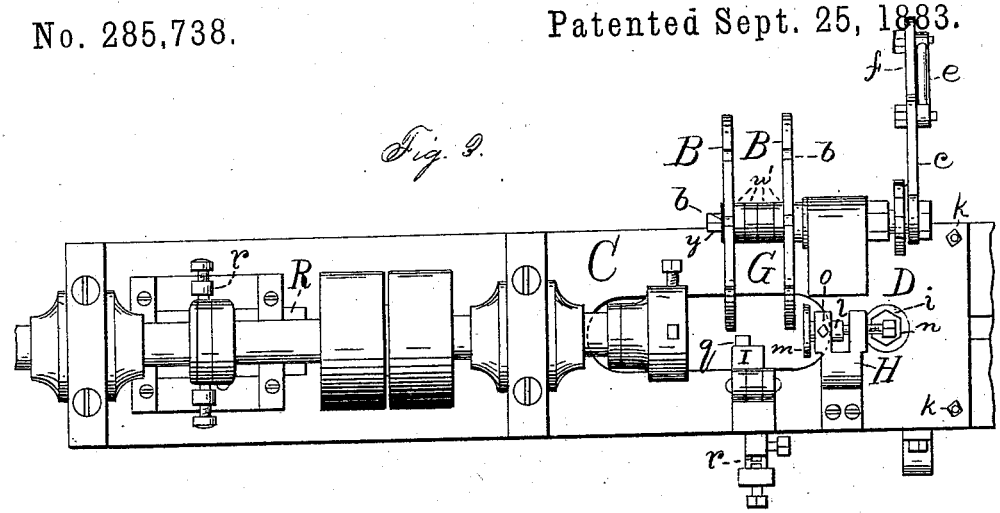
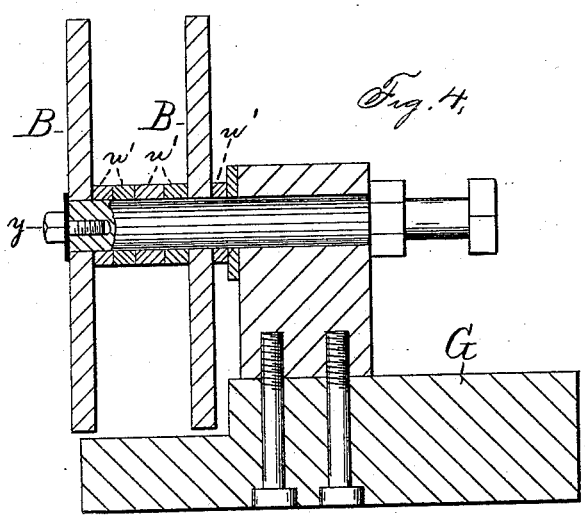
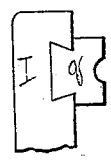
Witnesses.
John Edwards Jr.
C. B. Ibershaw
Inventor.
William B. Edwards.
By James Shepard
atty

UNITED STATES PATENT OFFICE.

WILLIAM B. EDWARDS, OF UNIONVILLE, CONNECTICUT, ASSIGNOR TO THE UPSON NUT COMPANY, OF SAME PLACE.

MACHINE FOR POINTING BOLTS.

SPECIFICATION forming part of Letters Patent No. 285,738, dated September 25, 1883.

Application filed March 1, 1882. (No model.)

*To all whom it may concern:*

Be it known that I, WILLIAM B. EDWARDS, of Unionville, in the county of Hartford and State of Connecticut, have invented certain new and useful Improvements in Machines for Pointing Bolts, of which the following is a specification.

My invention relates to improvements in machines for pointing bolts in which the bolts are placed promiscuously in a pan and fed by ordinary machinery to a feeding-trough, from which they are taken by a pair of notched disks moving under the end of the feeding-trough with an intermittent motion and carried to a point directly in front of a revolving pointing-tool, where they are clamped against said disks. The disks remain at rest while the pointing-tool is moved forward to point the bolt, after which it retreats, and another movement of the disks brings another bolt into position for a repetition of the operation.

The objects of my improvements are to produce an automatic machine for pointing bolts, to so construct the machine that it may be efficient and accurate in its operation, readily adjusted for pointing different lengths and sizes of bolts, and to provide against breakage or injury to the machine in case, for any reason, it should fail to present the bolt properly to the mechanism designed for its reception. I attain these objects by the mechanism illustrated in the accompanying drawings, in which—

Figure 1 is a front elevation, partly in section. Fig. 2 is a side elevation, partly in transverse section, on line x x of Fig. 1. Fig. 3 is a plan view of the main portion of the machine. Fig. 4 is a detached sectional view, partly in elevation; and Figs. 5 and 6 are side elevations of detached parts.

The bolts to be pointed are placed promiscuously in a pan or hopper, and by any ordinary mechanism they are fed therefrom into the feeding-trough A. A proper mechanism for thus feeding the bolts is quite common in machines for feeding wood-screws, and does not require to be herein described. The bolts thus fed into the trough will lie one upon another, filling the trough, the bottom bolt being stopped by the pair of disks B B at the lower end of the trough A. In the drawings, however, I have only shown (see Fig. 1) two bolts in the trough A, because to represent it as full of bolts would more or less obscure the other parts. The trough A is supported by a horizontally-slotted arm a, and secured thereon by a bolt, so that it may be adjusted to any desired position within certain limits with reference to the length of the machine. This arm a is connected by any suitable standard to the bed C of the machine. In Fig. 3 this arm and the feeding-trough are omitted, in order to better show the other parts.

The disks B B are mounted upon a shaft, which carries, also, a ratchet-wheel, D, by the side of which there is an oscillating pawl-carrier, c, and pawl d. This pawl-carrier is reciprocated by pitman e, lever f, spring g, and a cam, E, on the revolving cam-shaft F, underneath the bed C. By these devices an intermittent movement is given to the disks B B, the extent of which corresponds to the number of semicircular notches b in said disks—for instance, with eight notches in each disk their movement should be one-eighth of a revolution at each forward motion. The forward movement of the carrier to drive the ratchet-wheel forward is given by the spring g and its backward movement by the cam E, so that if the parts driven by the ratchet-wheel become clogged they will merely arrest the action of the spring, and no damage will ensue; whereas if the ratchet-wheel were driven forward by a positive mechanism, like the cam, the parts would be liable to injury in the event of clogging. The disks B B are placed such a distance apart as to support both ends of a bolt, with the small end of the bolt projecting, as shown in Fig. 1. When the disks are at rest, one notch in each disk is directly under the end of the trough A, as shown in Fig. 2, so that the bottom bolt falls into said notch. The front side of the trough is made just short enough so that when the bolt thus lies in the notches it can pass forward out from under the end of the trough. A guard, h, prevents the bolts from falling out of the notches in the disk until the bolts have been carried a little more than one-quarter of a revolution of the disks.

The disks B B, together with the pitman e and lever f, are mounted upon a sliding bed or carriage, G, which is made adjustable longitudinally on the main bed, C, and is held in position by a bolt, i. Said carriage G, with its appendages, is adjusted to the proper height on the bed C by means of four bolts, k, two of which go through the carriage G to the bed C from above, and two of which pass through the bed C from below to the carriage G above. This carriage G also has upon it a support for the head end of the bolt, consisting of standard H, short shaft l, mounted to move longitudinally therein, and provided with a plate or pad, m, on its left-hand end. At the opposite end is an adjusting-screw, n, by means of which the pad m may be adjusted to any desired point. A set-screw, o, holds the shaft l and its pad firmly in position when once adjusted, the adjusting-screw n also assisting in so holding said parts. Said carriage has also mounted upon it a lever, I, the upper end of which carries a holding-jaw, q, Figs. 3 and 6, a side view of the same being indicated by broken lines behind the upper end of the standard H in Fig. 2, the parts l, m, n, and o being omitted from said Fig. 2, in order to indicate the proper position of said jaw. A detached side view of this jaw q and upper end of the lever I is shown in Fig. 6. The lower end of the lever I is provided with an adjustable piece, r, for being acted upon by the cam J to force the jaw q against the bolt. The screw adjustable piece r enables a very nice adjustment of the lever I to be effected. A spring, s, holds the lower end of the lever I into engagement with the cam J.

The pointing-tool K may be of any ordinary construction. It is mounted upon the end of a longitudinally-moving lathe-shaft, L. At the other end of said shaft is a geared wheel, M, which, in connection with intermediate gears, N O, and gear P, drives the cam-shaft F. Upon the bed C there is a sliding block, R, having an upward-projecting forked arm, t, to connect it with the shaft L, and a downward-projecting arm, u, for being acted upon by the side cam, S. This cam is for moving the sliding block R and lathe-shaft L endwise to the left, and the spring T is for the purpose of moving said shaft in the opposite direction. The cam S and spring T are not represented in Fig. 2. Substantially the same manner of moving a shaft longitudinally has been employed in bolt-threading machines, and of itself is not claimed by me. As the bolts pass out from the lower end of the hopper, and are brought successively on the disks to a point directly between the supporting-pad m and the pointing-tool K, they remain at rest, and are held firmly against rotation by means of pressure of the jaw q upon each bolt as it lies in the notches of the disks. The cam J has a concentric face, which holds the lever I and jaw q against the bolt for a time, during which the cam S comes into position to allow the spring T to bring the lathe-shaft forward and point the bolt, when the cam again comes into action to return said shaft. The pad m is for the head of the bolt to abut against, to prevent it from moving endwise during the forward movement of the pointing-tool, and thereby to bring every bolt to exactly the desired length. The cam E acts to move the lever f, and consequently the pawl-carrier c, backward at a time when the piece r of lever I is upon the concentric face of cam J. When the pointing-tool is clear of the bolt, the cams J and E release their respective levers and allow the springs s and q to carry said levers back, to release the hold on the bolt, and throw the disk forward another eighth of a revolution, when the operation is repeated, as before, so long as the feeding-trough is supplied with bolts.

For different lengths of bolts the disks B B are set a greater or less distance apart. This I accomplish by means of split washers $u'$, Figs. 3, 4, and 5, which can very readily be changed to bring the disks the desired distance apart, after which the screw y may be made to hold the parts together. I force the lathe-shaft away from the bolt by a positive mechanism, as the rigid cam, and toward the bolt by a yielding mechanism, so that no harm may be done in case the bolt does not properly enter the pointing-tool. If desired, a spring-faced cam might be placed upon the cam-shaft F, to act upon the arm u as a substitute for the spring T.

I am aware that prior patents show notched disks, having an intermittent rotary motion, combined with a feeding-trough, guard, and holding-jaw, and that one patent shows, also, a support for the head of the bolt, which support revolves with said disks; also, the employment of uncut washers to adjust the distance between the disks; also, that another patent shows a machine differently constructed from mine for automatically pointing bolts.

I am aware that a prior patent shows a bolt-pointing machine in which a multiple bolt-holder is driven with an intermittent rotary motion by means of a ratchet-wheel, pawl, pawl-carrier, a cam, and gravity, the cam acting to drive the pawl-carrier forward in a direction to move the ratchet-wheel, while said carrier is returned by the force of gravity. In connection with said combination said patent shows a frictional device located between the cam and the pawl-carrier, so that in certain contingencies the action of the cam upon the carrier may be suspended by allowing the connections between the carrier and cam to give or slip; but notwithstanding this frictional device the carrier, when moved, is always carried forward by a cam and backward by the force of gravity. By making the cam act to force the carrier backward instead of forward, there is no necessity for the frictional device in my machine, and the construction is thereby simplified and cheapened. All of said prior art is hereby disclaimed.

I claim as my invention—

1. The combination of the feeding-trough A, notched disks B B, ratchet-wheel D, the pawl $d$, pawl-carrier $c$, the spring $g$, acting to force said pawl-carrier in the direction to move the ratchet-wheel forward, the cam E, acting to force the pawl-carrier backward to a given point with a positive movement, and suitable mechanism for operatively connecting said spring and cam with said pawl-carrier, substantially as described, and for the purpose specified.

2. The combination of the notched disks, ratchet-wheel D, pawl $d$, pawl-carrier $c$, pitman $e$, lever $f$, spring $q$, cams E J, and lever I, having the holding-jaw, substantially as described, and for the purpose specified.

3. The combination of the notched disks B B, having an intermittent rotary motion, the holding-lever I, the adjustable piece $r$, mounted thereon, and the cam J, substantially as described, and for the purpose specified.

4. The combination of the longitudinally moving and revolving shaft with pointing-tool mounted thereon, the notched disks B B, ratchet-wheel D, pawl-carrier and pawl $c$ $d$, the pitman $e$, lever $f$, and the carriage G, made longitudinally adjustable with the main bed C, said parts B B, D, $c$, $d$, $e$, and $f$ being mounted upon and moving with said carriage when adjustable longitudinally, substantially as described, and for the purpose specified.

5. The combination of the longitudinally moving and revolving shaft with pointing-tool mounted thereon, the notched disks B B, having an intermittent rotary motion, the lever having holding-jaw for acting upon the bolt in connection with said disks, the carriage made longitudinally adjustable with the main bed C, and bearing the said disks and holding-lever, and mechanism for adjusting said carriage and its appendages vertically with relation to the shaft L, substantially as described, and for the purpose specified.

6. The combination of the longitudinally moving and revolving shaft and its pointing-tool K, the lever I, having holding-jaw, the notched disks having an intermittent rotary motion, the standard H, rigidly mounted upon the carriage G, the supporting-pad secured to said standard, and mechanism for adjusting it therein, substantially as described, and for the purpose specified.

WILLIAM B. EDWARDS.

Witnesses:
 JAMES SHEPARD,
 JOHN EDWARDS, Jr.